Sept. 3, 1940.  H. S. HELLER ET AL  2,213,631
METHOD OF AND APPARATUS FOR MAGNETICALLY RECORDING SOUND
Filed Oct. 25, 1937  6 Sheets-Sheet 1

Inventors.
Herman S. Heller.
Leo G. Butler.

Attorney.

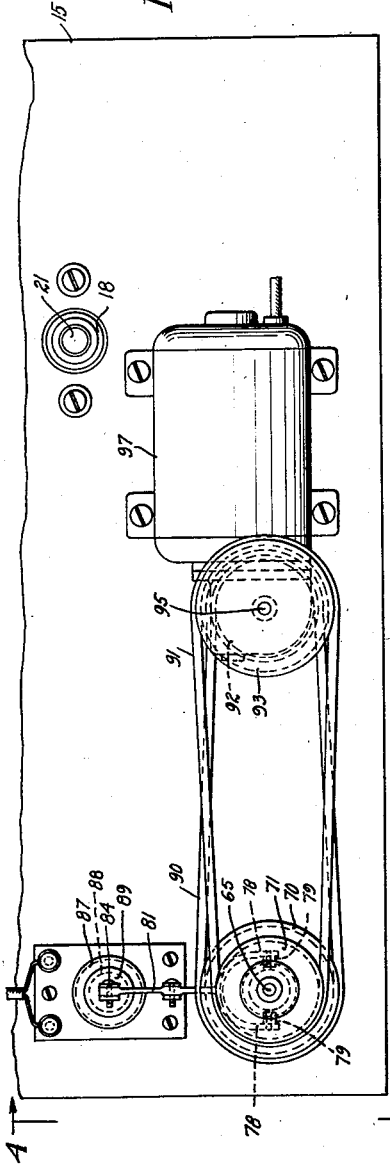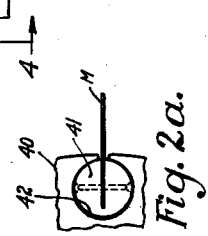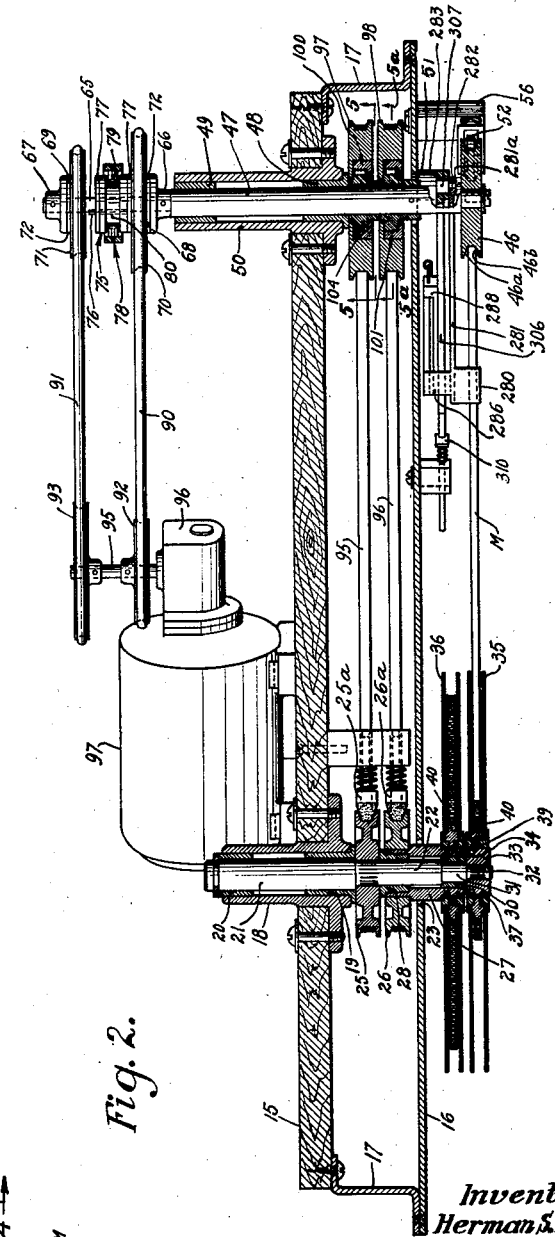

Sept. 3, 1940.   H. S. HELLER ET AL   2,213,631
METHOD OF AND APPARATUS FOR MAGNETICALLY RECORDING SOUND
Filed Oct. 25, 1937    6 Sheets-Sheet 3
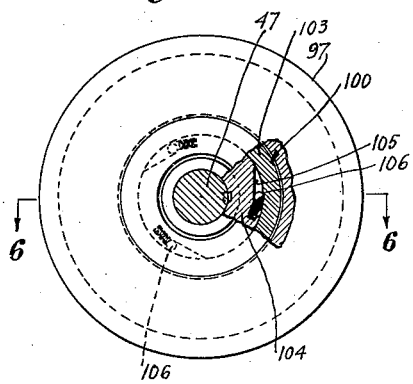
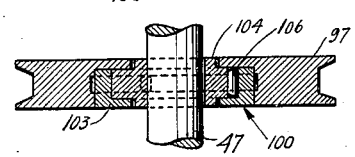
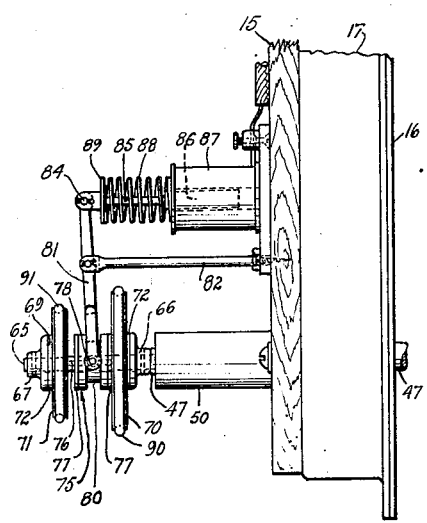
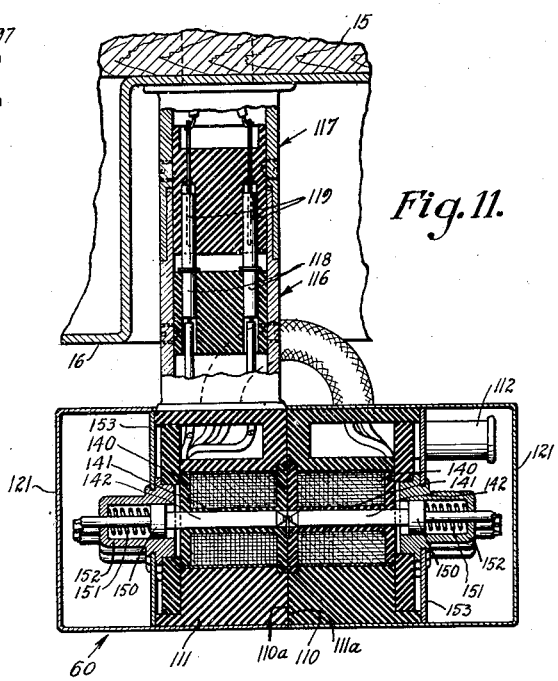
Inventors.
Herman S. Heller.
Leo G. Butler.
Attorney.

Sept. 3, 1940.   H. S. HELLER ET AL   2,213,631
METHOD OF AND APPARATUS FOR MAGNETICALLY RECORDING SOUND
Filed Oct. 25, 1937   6 Sheets-Sheet 4

Inventors.
Herman S. Heller.
Leo G. Butler.

Attorney.

Sept. 3, 1940.     H. S. HELLER ET AL     2,213,631
METHOD OF AND APPARATUS FOR MAGNETICALLY RECORDING SOUND
Filed Oct. 25, 1937     6 Sheets-Sheet 5
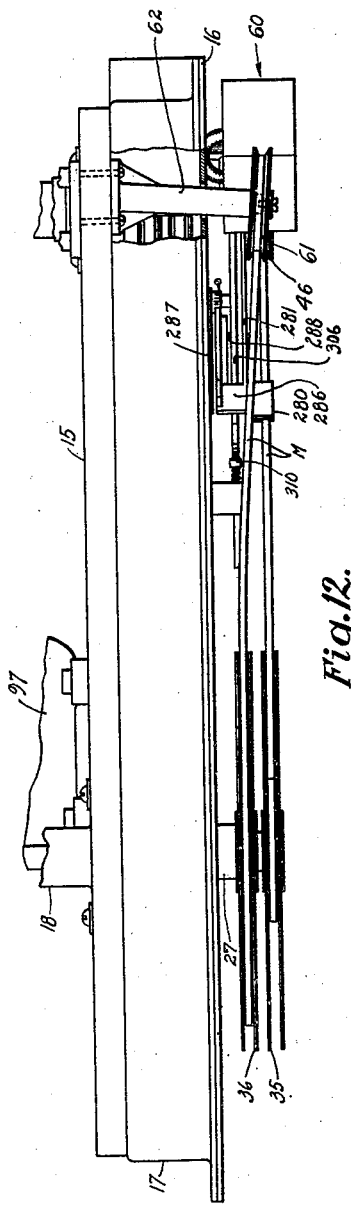
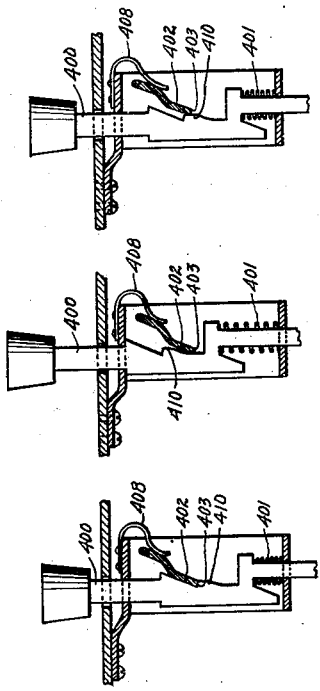
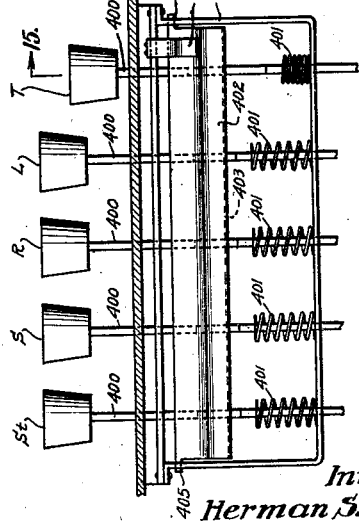
Inventors.
Herman S. Heller.
Leo G. Butler.
Attorney.

Patented Sept. 3, 1940

2,213,631

UNITED STATES PATENT OFFICE 2,213,631

METHOD OF AND APPARATUS FOR MAGNETICALLY RECORDING SOUND

Herman S. Heller, West Los Angeles, and Leo G. Butler, Inglewood, Calif.; said Butler assignor to said Heller Application October 25, 1937, Serial No. 170,988

41 Claims. (Cl. 179—100.2)

This invention relates generally to magnetic sound recording machines, and more particularly to machines for making magnetic recordings of dictation, telephone conversations, music, etc.

Magnetic recording machines as heretofore known have involved certain disabilities which have rendered them impracticable for dictation and many other purposes. Among these may be mentioned the fact that in order to secure recordation of all of the desired frequencies, the usual magnetic recording wire or tape had to be driven at such a high speed that it was not possible to make a continuous recording of a desirable duration on a convenient length of the recording wire or tape.

It is accordingly a primary general object of the present invention to provide a magnetic recording machine in which a recording of comparatively long duration may be made on a recording element of a normal or convenient length.

This general object is accomplished, first, by the provision of a recording element and pole pieces of such a nature that the recording element may be driven at lower speed than has been normal in prior machines of this class, and second by use of a magnetic recording element of the flat tape type and recording a multiplicity of times along the length of the tape in laterally spaced, or contiguous lines or lanes. In a present preferred form of the invention, the tape is driven through the machine first in one direction and then in the other, a recording being made on the tape during each such trip, and successive recordings being spaced laterally of one another on the width of the tape. Such multiple lane recording may be accomplished in various manners, though in the present preferred embodiment of the invention, as herein disclosed and specifically claimed, a multiplicity of sets of recording coils and pole pieces are provided, one allotted to and positioned opposite each recording lane. Another manner of accomplishing multiple lane recording is disclosed in a copending application of Herman S. Heller, entitled "Multiple lane magnetic sound recording system," filed Jan. 22, 1938, Serial No. 186,351, the generic claims broadly covering multiple lane recording being made, however, in the present application.

Further objects of the invention are:

To provide novel and improved automatic means, in a multiple lane magnetic recording machine, for reversing the direction of drive of the recording tape each time the end of the tape is reached;

To provide means under convenient control of the operator for reversing the direction of the tape at any stage of the recording operation, and for causing the machine to run the tape in reverse either to the beginning end of the lane being recorded, or else to any desired position in said lane;

To provide conveniently controllable means for running the machine in reverse to any position of any lane on the tape;

To provide monitor means, capable of being cut in after the machine has been run in reverse to any desired point of any one of the recording lanes which has been impressed with a record, for causing the machine to run in a forward direction from such point and to audibly reduce the record to enable a review of any part of the record which has been made;

To provide means for obliterating any part of the record which has been made on any one of the recording lanes and inserting a corrected recording in place thereof, without effecting previously recorded matter on adjacent lanes;

To provide means for causing the machine to drive the tape at increased speed whenever operated in reverse;

To provide improved means for driving a magnetic tape at constant speed past the recording elements, and also to provide a compact and improved arrangement of supply and take-up reels.

The nature of the present invention will best be understood by referring without further preliminary description to the following detailed description of a present preferred embodiment thereof, in the course of which various objects and features of the invention not heretofore mentioned will appear and be explained. Reference for this purpose is directed to the accompanying drawings, in which:

Fig. 2 is a section taken on line 2—2 of Fig. 1;

Fig. 2a is an enlarged detail showing the anchor piece on the end of the tape;

Fig. 3 is a view looking at the rearward side of a portion of the machine shown in Fig. 1;

Fig. 4 is a view taken as indicated by arrow 4—4 of Fig. 3;

Fig. 5 is a section taken as indicated by line 5—5 of Fig. 2;

Fig. 5a is a section taken as indicated by line 5a—5a of Fig. 2;

Fig. 6 is a section taken as indicated by line 6—6 of Fig. 5;

Fig. 11 is a cross section on line 11—11 of Fig. 7;

Fig. 12 is a top plan view of a portion of the machine, parts being broken away;

Fig. 14 shows an interlocking type switch utilized in the electrical system; and Figs. 15, 16 and 17 are cross-sections on line 15—15, illustrating the operation of the interlocking switch.

Figure 1:
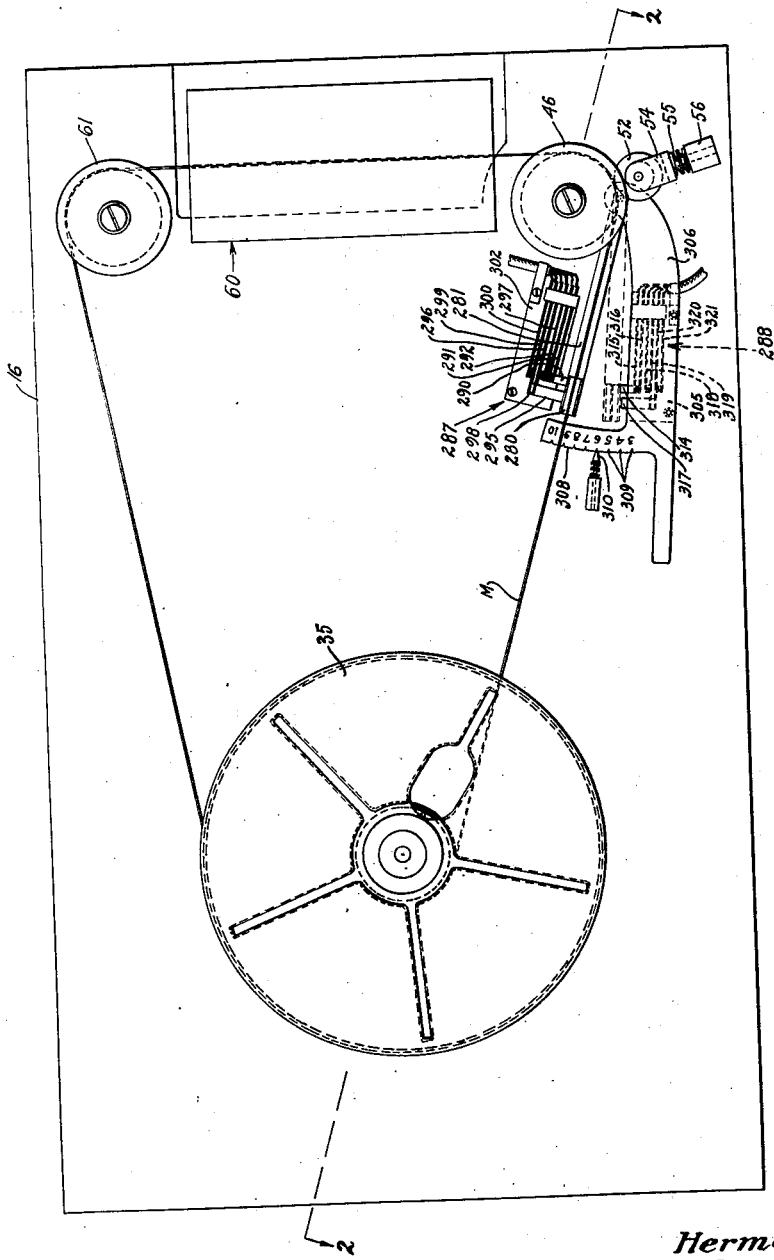
Fig. 1 is a front elevation of an illustrative recording machine in accordance with the present invention.

The exemplification of the invention illustrated in the drawings has a supporting panel 15, preferably, though not necessarily, vertically disposed, and spaced forwardly of supporting panel 15, a vertical panel 16 adapted to carry certain members and serving to enclose portions of the driving gear located forwardly of supporting panel 15. As here shown, panel 16 is supported from panel 15 by means of supporting brackets 17 (see Fig. 2).

Mounted on and extending through panel 15 is a tubular bearing member 18 having bushings 19 and 20 within which is journalled spindle 21, the latter being provided with a reduced portion 22 extending forwardly through an opening 23 in front panel 16.

Tightly mounted on spindle portion 22, immediately forwardly of bushing 19, is a belt pulley 25, and just forwardly of pulley 25 is an equal diameter pulley 26 which is tightly mounted on the inner end of a sleeve 27 which is mounted on a bearing bushing 28 rotatable on spindle portion 22. The outer end of sleeve 27 is supported by a bearing bushing 30 which is rotatable on a portion 31 of spindle 21 reduced to a diameter smaller than that of portion 22. The extremity 32 of spindle 21 is reduced still further, and has tightly mounted thereon an annular member 33 of the same outside diameter as the reduced outer end 34 of sleeve 27. A pair of reels 35 and 36 for the magnetic tape are mounted in concentric, closely spaced relation on member 33 and sleeve portion 34, respectively. The reels are keyed on said members, as indicated at 37, and are preferably arranged for ready demountability. For example, the hub portions 40 of the reels may be arranged for sliding engagement with members 33 and 34, and may be releasably retained thereon by any suitable spring clamp devices as indicated at 39.

Each of reels 35 and 36 has a central hub portion 40 to which the magnetic tape M may be anchored, in any suitable manner, and on which said tape is reeled. For example, as indicated in Fig. 2a, the end of the tape may be provided with an anchor piece 41 adapted to be engaged in a key-hole slot 42 formed in hub member 40. The tape is wound on the hub of reel 35 in such direction that it may extend toward the right, in the aspect of Fig. 1, from the bottom of the roll, as clearly indicated in Fig. 1, the reel thus turning in a counter-clockwise direction, as viewed in Fig. 1, as tape M is fed therefrom, or in a clockwise direction as the tape goes onto said reel. Assuming the tape to be fed from reel 35, it is taken toward the right, as viewed in Fig. 1, to pass under and then upwardly from a drive pulley 46. This pulley 46, which is preferably alined with reel 35 (see Fig. 2) is tightly mounted on the reduced extremity of a drive shaft 47 journalled for rotation in bushings 48 and 49 supported by a tubular bearing member 50 mounted on and extending through supporting panel 15, said shaft passing through an opening 51 in front panel member 16. Means for driving shaft 47 will be explained later. Tape M is pressed into driving engagement with pulley 46 by a spring-pressed idler roller 52. This idler roller 52, which engages the tape and presses it against the tread 46a of pulley 46 between pulley flanges 46b, is carried by a yoke 54 furnished with a guide stem 55 which non-rotatably but slidably engages a bracket or support 56 mounted on panel 16.

From drive pulley 46, tape M passes upwardly through tone head 60 comprising a plurality of translating and erasing electromagnets to an idler pulley 61, and after passing over pulley 61, the tape is taken to inner reel 36. The tape goes on to the upper side of the roll reeled on reel 36, being wound thereon by counter-clockwise rotation of reel 36 during drive of the tape from reel 35 to reel 36. Of course, when drive pulley 46 turns right handedly, the tape is driven from inner reel 36 over idler pulley 61 and drive pulley 46 to outside reel 35, reels 35 and 36 rotating in a clockwise direction.

Preferably, idler pulley 61 is mounted on an angularly disposed shaft 62 mounted on panel 15, as shown in Fig. 12, the pulley being so disposed that the point of tangency between it and the tape coming from lower pulley 46, is vertically alined with pulley 46, and the angle of pulley shaft 62 being such as to direct the tape toward inside reel 36. If desired, the tape may be given a twist between pulley 61 and reel 36, in order to enable it to go onto reel 36 more readily, though ordinarily this will not be necessary.

Shaft 47 has a rearward reduced portion 65, on which are pinned spaced collars 66 and 67 providing opposed faces 68 and 69, respectively. Rotatably mounted on shaft portion 65 adjacent faces 68 and 69 are belt pulleys 70 and 71, respectively.

Friction washers 72 are placed between the pulleys and adjacent surfaces of the collar members 66 and 67.

A clutch 75 is splined as at 76, on shaft portion 65 between pulleys 70 and 71. This clutch is faced on opposite sides with friction washers 77, and is adapted to be moved alternately against pulleys 70 and 71 by a fork member 78. Thus, as here shown, fork member 78 has studs 79 engaging in a peripheral groove 80 in clutch 75, and has an arm 81 (see Fig. 4) pivotally mounted on a post 82 mounted on supporting panel 15, the opposite end of the fork arm being pivotally connected at 84 to a link 85 connected to the movable plunger 86 of a solenoid 87 mounted on panel 15. A compression spring 88 acting between the solenoid and a flange 89 on link 85 normally holds solenoid core 86 in an extended position, and acts on fork member 81 to cause the latter to press clutch 75 against inner pulley 70, thus frictionally clamping the latter in driving relation on shaft portion 65. When solenoid 87 is energized, its core 86 is pulled inwardly and acts against spring 88 to swing fork arm 81 in such manner as to move clutch 75 away from inner pulley 70 and over against outer pulley 71, thus releasing pulley 70 for free rotation on shaft portion 65 and frictionally clamping pulley 71 in driving relation on shaft portion 65.

Pulleys 70 and 71 are connected by belts 90 and 91 to pulleys 92 and 93, respectively, pinned on a shaft 95 driven through reduction gear set 96 from electric drive motor 97. Pulley 93 is of a larger diameter than pulley 92, so that pulley 71 rotates constantly at higher speed than does pulley 70. Accordingly, shaft 47 is driven at higher speed when driven through pulley 71 than when driven through pulley 70. In normal forward running of the machine, solenoid 87 is de-energized and spring 88 accordingly holds clutch 75 against pulley 70, so that the machine runs normally at its lower speed. Upon energization of solenoid 87, however, clutch 75 is moved over to pulley 71, so that drive is at such time effected through large pulley 93 and outside pulley 71, and shaft 47 is therefore rotated at a higher speed. The degree of increased speed obtained upon energization and actuation of the solenoid of course depends upon the relative diameters involved; preferably, the high speed operation should be at least double the normal speed, and if desired may be still higher. Various alternatives may of course be provided within the scope of the present invention for securing an increased speed of drive under certain conditions of operation of the machine, that here shown being simple and illustrative of any such speed change means.

Means are provided for driving inside reel 36 and allowing outside reel 35 to idle when drive pulley 46 is being driven in such direction as to drive tape M from reel 35 to reel 36, and to drive outside reel 35 and allow inside reel 36 to idle when drive pulley 46 is driving the tape in the reverse direction. For this purpose, the aforementioned pulleys 25 and 26 are connected by belts 95 and 96 with pulleys 97 and 98, respectively, arranged for alternate drive from shaft 47 as said shaft is rotated in one direction or the other. As a simple and preferred means to this end, pulleys 97 and 98 are driven through one-way drive clutches, here shown as roller-ratchet clutches 100 and 101, respectively, from drive shaft 47, said clutches being arranged to drive alternately as shaft 47 is rotated in one direction or the other. Pulleys 97 and 98 are mounted on the outer ring portions 103 of the roller ratchet clutches, the inner members 104 of the clutches, which are provided with the usual notches 105 and rollers 106, being keyed on shaft 47. As will be evident from Figs. 5 and 5a, pulley 98 is driven through roller ratchet clutch 101 when shaft 47 is rotated in a counter-clockwise direction, as viewed from the front of the machine, while pulley 97 is driven through roller ratchet clutch 100 when shaft 47 is rotated in a clockwise direction. Accordingly, when shaft 47 is driven from motor 97 in a counter-clockwise direction, pulley 46 on the end of said shaft drives tape M from outside reel 35 toward inside reel 36, and pulley 98 is driven through roller ratchet clutch 101 to drive reel 36 to take the tape up properly. At the same time, pulley 97 idles on shaft 47, reel 35 being rotated simply by the tape which is being fed from it. And when pulley 46 is being rotated by shaft 47 and electric motor 97 in a clockwise direction, so as to drive tape M from inside reel 36 toward outside reel 35, outside reel 35 is driven through roller ratchet clutch 100, belt 95 and pulley 25 to take up the tape properly, inside reel 36 at this time rotating freely as the tape is drawn therefrom.

The relations of the driving gear should be such that the reel which is acting as the supply reel will not be rotated by the tape at such a speed, as the roll of tape on the reel approaches its minimum diameter, as to drive rearwardly through pulley 25 or 26, as the case may be, at a sufficiently high speed to cause the corresponding pulley 97 or 98 to overtake the inner driven member of its roller ratchet clutch and thus tend to drive said inner member faster than it is being rotated by shaft 47. Any such tendency would of course be relieved by slippage of belts 95 or 96, as the case might be. However, this condition is avoided by properly relating the diameters of pulleys 97 and 98 to pulleys 25 and 26 as well as the diameter of pulley 46 to the diameter of the hubs of the two reels. Preferably, in order to safeguard against this condition, pulleys 25 and 26 are made of slightly smaller diameter than pulleys 97 and 98, and the effective diameter of pulley 46 is no greater than the diameter of the hub portion 40 of the reels. With this arrangement, there is positive assurance that the supply reel cannot drive rearwardly in the manner described. This arrangement also provides a desirable overdrive on the reel which is acting as the take-up reel.

Preferably, pulleys 25 and 26 are provided with spring pressed friction shoes 25a—26a, respectively, which serve to prevent overrunning of the reels.

Tone head 60 is shown best in Figs. 7 to 11, to which reference is now directed. This head embodies two rectangular insulation blocks 110 and 111. A pair of headed pins 112 pass with sliding fit through block 110 and tightly engage block 111. Block 110 is thus movable toward and from block 111 on pins 112, the opposing faces of the two blocks being in engagement with one another when the device is in operating position. Preferably, pins 112 have hinge joints 113 permitting block 110 to be swung away from block 111 after being pulled outwardly on pins 112. This opening arrangement, which is of great convenience in threading the recording tape between the two blocks and inserting or replacing the pole pieces in the device, and other features of the tone or sound head are disclosed and claimed in my copending application entitled "Sound head for magnetic recording machines," Serial No. 170,985, filed Oct. 25, 1937.

As here shown (see Fig. 11), block 111 is mounted on the outer end of a plug member 116, which is adapted to be removably inserted in a socket member 117 mounted on panel 15. Leads from the erasing and recording coils are connected to pins 118 of plug member 116, which engage connector members 119 of socket member 117 when member 116 is inserted in 117. A suitable number of such pins and connectors are provided to take care of the leads from the erasing and recording coils, and also to take care of a ground lead coming from certain magnetic sheathing members, later to be mentioned.

The opposed faces 110a and 111a of blocks 110 and 111 are formed with a longitudinally extending groove or way 115 adapted to receive and pass the recording tape. For example, assuming use of a tape of .002" in thickness and .125" in width, this way may be .003" in depth and .126" in width. The way should be only sufficiently larger than the cross sectional size of the tape to permit the tape to be drawn freely therethrough. The two blocks may be grooved in such a manner that the depth of this way 115 lies half within each block when the two blocks are in face-to-face engagement, as in Fig. 7.

If there are to be three recording lanes on the magnetic tape, three sets of recording or translating and erasing coils are mounted in laterally offset or staggered positions in blocks 110 and 111. The tape may be considered as divided laterally into two edge lanes and a middle lane, each of a width of one third the full width of the tape. Thus, a pair of erasing coils $E_1$ and a pair of recording or translating coils $R_1$ are mounted in blocks 110 and 111, with their axes in line with the center of one edge lane of the tape (see Figs. 9 and 11). A second pair of erasing coils $E_2$ and a second pair of recording or translating coils $R_2$ are mounted in blocks 110 and 111, with their axes in line with the center of the middle lane of the tape, and a third pair of erasing coils $E_3$ and a third pair of recording or translating coils $R_3$ are mounted in blocks 110 and 111, with their axes in line with the center of the other edge lane of the tape.

Assuming, as typical of the invention, that the tape runs in a downward direction through tone head 60 while a record is being made on the first edge lane of the tape, travels upwardly through the tone head while a record is being made on the second or middle lane, and again travels downwardly while a record is being made on the third edge lane, the relative disposition of the several coils is typically as follows: Erasing coils $E_1$ are located above recording coils $R_1$, erasing coils $E_2$ are located below recording coils $R_2$, and erasing coils $E_3$ are located above recording coils $R_3$. Thus when the tape travels downwardly for the purpose of recording on the first edge lane, it first passes erasing coils $E_1$ and then recording coils $R_1$; when the tape subsequently passes upwardly, for the purpose of recording on the middle lane, it first encounters erasing coils $E_2$ and then recording coils $R_2$; and when the tape next travels downwardly for the purpose of recording on the opposite edge lane, it first encounters erasing coils $E_3$ and then recording coils $R_3$.

Each of the recording and erasing coils comprises a wound magnetic bobbin 140 provided with a central aperture 141 of rectangular cross section for the magnetic pole piece 142. Bobbins 140 are received within cylindrical magnetic sheaths 140a tightly mounted within insulation block 110 or 111, as the case may be. Sheaths 140a are interconnected by a grounded conductor 140b (see Fig. 8). Preferably, the inside flange 141a of each bobbin is provided with a pair of lips 141b adapted to be received within notches 141c formed in the insulation blocks 110 and 111 in which the coils are mounted. These lips and notches are so related to the pole piece aperture 141 that when the bobbins are mounted in blocks 110 and 111, apertures 141 are disposed exactly at right angles to the way 115 for the magnetic tape.

Pole pieces 142 of rectangular cross section, are slidably mounted in apertures 141, and their inner ends, which are beveled and tapered to an edge preferably not over approximately .003" in thickness and of a dimension at right angles to the tape approximately, or slightly less than, ⅓ of the width of the tape (assuming three-lane recording). The pole pieces may be formed initially with a comparatively sharp, chisel-like edge 142a, but by reason of wear on the tape are soon blunted somewhat and operate satisfactorily, with comparatively slow speed of a tape, at a thickness dimension of approximately .003" as stated above. The greater dimension transversely of the tape of the shank of the pole piece as compared with the restricted pole piece tip is to increase the cross-section of the magnetic material and thus reduce the reluctance of the magnetic circuit. The pole piece shape as described provides sufficient magnetic material to assure a proper magnetic circuit, while at the same time affords a restriction at the tip of such a nature that the pole piece acts exclusively on its delegated limited width lane of the tape.

Figures 7, 8, 9:
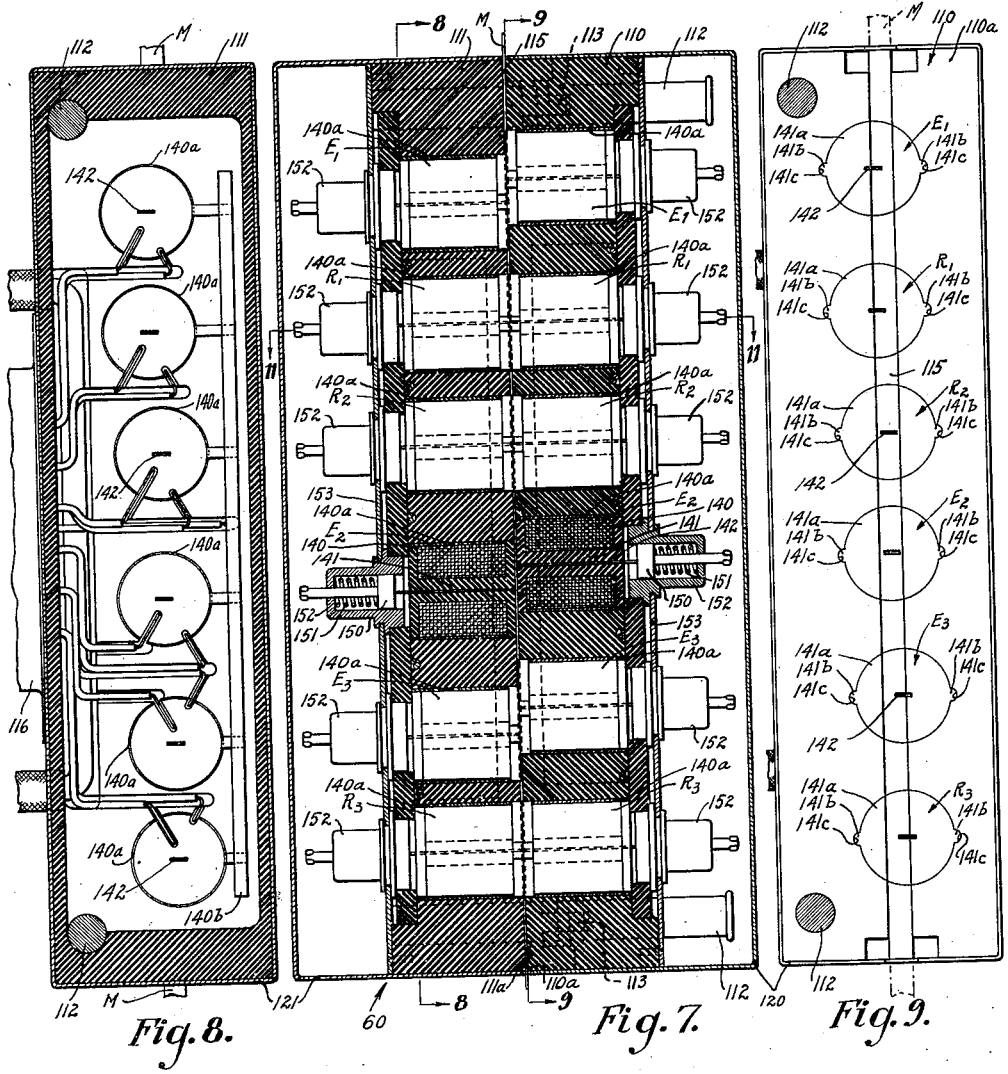
Fig. 7 is a longitudinal vertical section through the recording coil and pole piece assembly.
Fig. 8 is a section taken on line 8—8 of Fig. 7.
Fig. 9 is a view taken on line 9—9 of Fig. 7.
Figure 10:
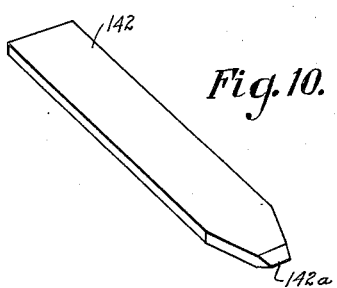
Fig. 10 is a perspective view of a pole piece.

The outer ends of pole pieces 142 are engaged by plunger members 150 pressed lightly against the pole pieces by means of compression springs 151 mounted in housings 152 carried by plates 153 which are mounted on the insulation blocks, as in the manner clearly illustrated in Fig. 7.

In the embodiment of the invention here shown, the pole pieces of each pair of erasing coils are somewhat offset from one another in a direction longitudinally of the tape, while each pair of recording coil pole pieces are directly opposite one another, as clearly indicated in Fig. 7.

The tips of each pair of pole pieces are thus lightly pressed into contact with opposite sides of the recording tape, but are of such dimensions as to contact the tape only within the lane area within which said pole pieces are to act.

Preferably, rectangular electrically grounded magnetic sheaths 120 and 121 are placed over blocks 110 and 111, respectively, entirely enclosing said blocks except for their meeting faces. These sheaths serve to screen out extraneous magnetic fields which might cut the recording coils and produce noise.

Several methods of erasing or obliterating past history on the tape are known in the prior art and are capable of use in the present system. Patent No. 1,459,202 to Fuller, for example, discloses two well known methods, one consisting of energizing the erasing coils with a high frequency alternating current, which leaves the tape entirely demagnetized, and the other consisting of energizing the erasing coils with a direct current of sufficient strength to magnetize the tape to saturation, or in other words polarize the tape. Either of said methods or any other found suitable may be employed in connection with the present invention, and while we here show the simple case in which the erasing coils are energized with direct current, this of course constitutes no limitation on the invention, and it will be understood that the erasing electromagnets may be energized with currents of any type which will give the desired result.

It is to be understood that when a recording is to be made on any lane of the tape, the corresponding erasing coils are supplied with an erasing current. Assuming use of a direct current for this purpose, this produces a magnetic flux through the tape between the erasing coil pole pieces, and causes the tape to be magnetized to saturation, thereby obliterating any prior recording on said lane. At the same time the corresponding recording coils are energized by a voice current, producing a correspondingly varying flux through the tape between the tips of the recording coil pole pieces, and thereby effecting a magnetization of the tape corresponding to the fluctuations of the voice current. The resulting magnetized sound record on the tape is subsequently reproduced by running the tape between a pair of reproducing coils, which may be either the coils used for recording, or may be other, similar coils. Voice currents corresponding to the recording on the tape are generated in the coils in the reproducing operation, and are reproduced by suitable reproducing equipment.

In accordance with the present invention, a multiplicity of recordings are made side by side on a single tape. It is found in practice that these recordings do not substantially or noticeably affect one another, and that one lane may be erased, or recorded on, without affecting a previous recording on an adjacent lane.

Figure 13:
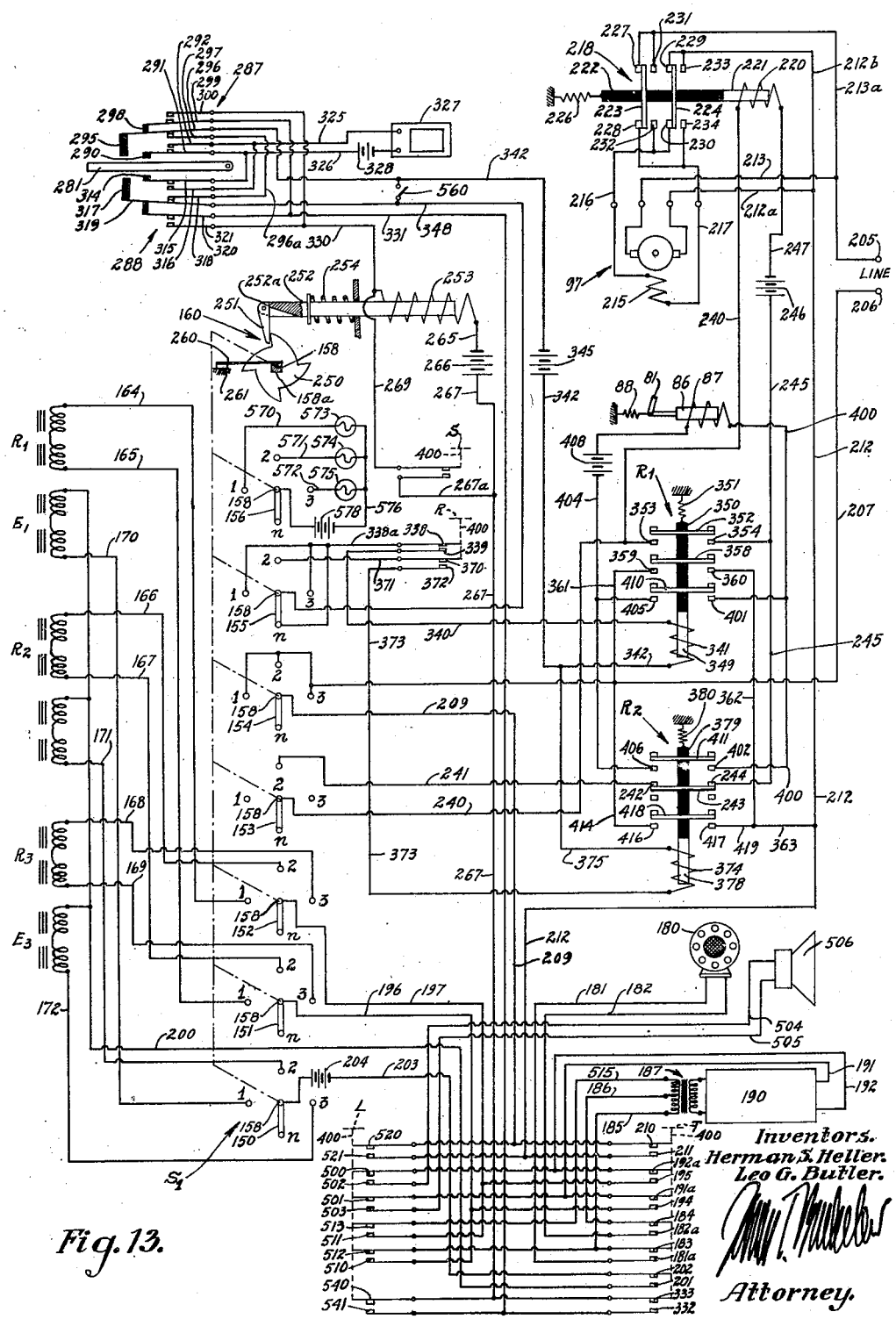
Fig. 13 is a schematic wiring diagram of the electrical system and switches embodied in the machine.

The electrical system is schematically shown in Fig. 13, to which reference is now directed. A multiple switch $S_1$ is provided, having a series of rotatable switch arms 150 to 156, inclusive, which will be understood to be mounted on a common shaft 158, driven through successive 90° rotative movements (assuming three lane recording) by operating means generally designated at 160. Switch arms 150 to 156 are shown in Fig. 13 as all making with neutral contacts designated $n$. As shaft 158 is rotated righthandedly through successive 90° rotative movements, switch arms 150 to 156 make successively with 90° spaced contacts designated 1, 2 and 3, finally coming back to contacts $n$ as control shaft 158 completes a full revolution.

Recording coils $R_1$ of the previously described recording unit, are series connected, and are connected by leads 164 and 165 across contacts 1 of switch arms 151 and 152, respectively. Recording coils $R_2$, which are also series connected, are connected by leads 166 and 167 across contacts 2 of switch arms 151 and 152, while series connected recording coils $R_3$ are connected by leads 168 and 169 across contacts 3 of switch arms 151 and 152.

Erasing coils $E_1$, $E_2$, and $E_3$ are connected at one side by leads 170, 171 and 172 to contacts 1, 2 and 3, respectively, of switch arm 150.

A manual switching system is provided, preferably operated by five control push buttons T, L, R, S and St, which are preferably of a common interlocking type, so designed that depression of any button effects release of any previously depressed button. Button St appears in the drawings only in Fig. 14. Thus, depression of any one of push buttons T, L, R, S or St causes any one of the remaining keys which was previously depressed to be released, while the depressed button stays down until some other button is depressed whereupon it is automatically released. A typical interlocking switch of this type is shown in Figs. 14, 15, 16 and 17, to which attention is now directed. Control buttons T, L, R, S and St are mounted on reciprocable switch operating members 400, each of which will be understood to act when depressed to close a series of switch contacts, as diagrammatically indicated in Fig. 13. Members 400 are pressed in an upward direction by coil springs 401, and are held down against said springs, after having been depressed, by engagement of a pivotally mounted locking plate 402 with a shoulder 403 formed thereon. Locking plate 402 is pivotally mounted at its ends, as at 405, in a supporting frame 406, which also serves as a seat for springs 401. Plate 402 is yieldingly pressed inwardly against members 400 by a spring member 408.

Fig. 15 shows one of the members 400 in fully depressed position, locked down by plate 402, while Fig. 16 shows the member in upper or released position. When any one of members 400 is moved downwardly from the position of Fig. 16 toward that of Fig. 15, locking plate 402 is cammed outwardly by a cam surface 410, as in Fig. 17, so that any one of members 400 which was previously in the depressed position of Fig. 15, is then released by reason of removal of plate 402 from its shoulder 403, so that said previously depressed member 400 is released and moved upwardly by its spring 401. As the member 400 being depressed then reaches the position of Fig. 15, locking plate 402 is moved inwardly by spring 408 to engage its shoulder 403, and therefore remains down until some other member 400 is depressed. Thus, when any one of control buttons T, L, R, S or St is depressed to the position of Fig. 15, that button then remains depressed, locked down by plate 402, and holding its corresponding switch contacts closed, while the operation of depressing that button automatically releases any previously depressed button, so that only one of said buttons will be in depressed position at any one time. Each of control buttons T, L, R, and S operate when depressed to close certain switch contacts, as indicated in Fig. 13. Control button St, however, has no switch contacts associated therewith, and is employed as a "Stop" button, simply acting when depressed to release any previously depressed button. Thus when button St is depressed, all of the switch contacts controlled by buttons T, L, R and S are open.

A microphone is indicated at 180, and is shown as connected by leads 181 and 182 to contacts 181a and 182a of a series of switch contacts operated by depression of "Take" push button T. When button T is depressed, contacts 181a and 182a make contact with a pair of contacts 183 and 184, respectively, which are connected by leads 185 and 186 across a portion of the input winding of an audio frequency transformer 187. The output winding of said transformer 187 is connected to vacuum tube amplifier 190, the output terminals of which are connected by leads 191 and 192 across contacts 191a and 192a of the switch operated by push button T. Contacts 191a and 192a make contact, when push button T is depressed, with contacts 194 and 195, respectively, which are connected by leads 196 and 197 to switch arms 151 and 152, respectively. Accordingly, when button T is depressed and switch arms 151 and 152 are in contact with switch contacts 1, microphone 180 is connected through amplifier 190 across switch contacts 1, and therefore is connected to first lane recording coils $R_1$. Similarly, when switch arms 151 and 152 are in contact with contacts 2, the microphone is connected to second lane recording coils $R_2$ and when switch arms 151 and 152 make with contacts 3, the microphone is connected to third lane recording coils $R_3$.

Erasing coils $E_1$, $E_2$ and $E_3$ are connected by common conductor 200 to a contact 201, which, when button T is depressed, makes with a contact 202 connected by lead 203 to switch arm 150. A battery 204, for energization of the erasing coils, is shown included in lead 203. Thus, when the switch arms of switch $S_1$ are in position to make with contacts 1, a circuit including battery 204 is completed through erasing coils $E_1$, when the switch arms make with contacts 2 a circuit is closed energizing erasing coils $E_2$, and when the switch arms are in contact with contacts 3, a circuit is closed energizing erasing coils $E_3$.

Rotation of shaft 158 of switch $S_1$ to carry switch arms 150, 151 and 152 successively to contacts 1, 2 and 3 thus successively cuts in the sets of erasing and recording coils $E_1 R_1$, $E_2 R_2$ and $E_3 R_3$. It will be described hereinafter how switch $S_1$ is actuated to bring switch arms 150, 151, 152, etc., into contact with contacts 1 to start operation of the machine and effect a recording on the first lane of the tape, with the tape running in one direction, how at the end of the first lane, the switch arms are moved to make with contacts 2, causing the tape to reverse direction and the erasing and recording coils to act on the second or middle lane of the tape, and how the switch arms are next moved to contacts 3 to again cause the tape to be driven in the first direction and to effect a recording on the third lane of the tape, at the end of which the switch arms are automatically moved back to starting position $n$.

The previously mentioned drive motor for the machine is indicated in Fig. 13 at 97, being shown as a shunt motor, although other types of reversible motors may of course be used if desired. The power supply line is connected across the power input terminals 205 and 206, terminal 206 being connected by a conductor 207 to all three terminals 1, 2 and 3 successively contacted by an arm 154 of switch $S_1$. Arm 154 is connected by lead 209 to a contact 210, which when control button T is depressed, makes with contact 211 connected to a conductor 212 which has a branch 212a going to one side of the armature of motor 97. The other side of the armature of said motor is connected by conductor 213 to the other current supply terminal 205. Thus, when control button T is depressed and switch $S_1$ is in any one of positions 1, 2 or 3, supply line current flows through the described circuit to the armature of motor 97. This circuit is of course open except when switch arm 153 is in contact with either of contacts 1, 2 or 3. The field winding 215 of motor 97 is connected by conductors 216 and 217 through an automatic polarity reversing switch 218 across branch conductors 212b and 213a connected in parallel with armature current supply leads 212a and 213.

Polarity reversing switch 218 is actuated by a solenoid 220, the movable core 221 of which operates an insulation member 222 carrying a pair of conductor members 223 and 224. When solenoid 220 is deenergized, a coil spring 226 moves the solenoid and insulation member 222 in a direction to bring conducting members 223 and 224 against pairs of contacts 227, 228 and 229, 230, respectively. When solenoid 220 is energized, its core 221 is attracted and moved against spring 226 to carry conductor member 223 against a pair of contacts 231, 232, and conductor 224 against a pair of contacts 233, 234. Contacts 227 and 231 are electrically connected to conductor 213a, and contacts 229 and 233 are electrically connected to conductor 212b. Contacts 228 and 234 are electrically connected to one field winding lead 217, while contacts 232 and 230 are electrically connected to the other field winding lead 216. It will be evident that when switch 218 is in the normal position illustrated in Fig. 13, the field winding 215 of motor 97 is energized with one polarity with reference to the armature of the motor, field winding lead 216 being connected through switch 218 to current supply lead 212b and field winding lead 217 being connected through said switch to current supply lead 213a. When solenoid 220 is energized, however, switch members 223 and 224 connect field winding lead 216 to lead 213a and connect field winding lead 217 to current supply lead 212b, thus reversing the polarity of the field with reference to the armature, and causing the motor to run in reverse direction.

In the present illustrative embodiment of the invention, motor 97 is so connected as to drive the machine normally in such a direction as to move the tape from inside reel 36 over idler 61, downwardly through the tone head or recorder unit 60 to drive pulley 46, and from there to outside reel 35. When solenoid 220 is energized, the direction of the motor is reversed, and the tape therefore is moved from outside reel 35 over drive pulley 46 and upwardly through tone head 60 to idler 61, and thence to inside reel 36.

Solenoid 220 is energized to cause the motor to run in reverse when position 2 of switch $S_1$ is reached by the following means. Switch arm 153 of switch $S_1$ at such time makes with contact 2, thus closing an electric circuit from solenoid 220 by way of conductor 240 to switch arm 153, and from contact 2 of switch arm 153 by way of conductor 241 to a switch contact 242, through a switch conductor 243 to a switch contact 244, and from there by way of conductor 245 to one side of battery 246, the other side of which is connected by lead 247 to solenoid 220.

It will be evident from the foregoing that the position of switch $S_1$ at any given time determines the lane on which the recording is being made. When switch shaft 158 is in neutral position, switch arms 150, 151, 152, etc., are all in neutral position, and the erasing, recording, motor, and motor reverse circuits are all open. When shaft 158 of switch $S_1$ is moved to bring the switch arms into contact with contacts 1, the circuits of erasing and recording coils $E_1$ and $R_1$ are closed, and the motor is energized to drive the tape in through the machine from reel 36 toward reel 35, effecting a recording on one lane of the tape. When shaft 158 of switch $S_1$ is moved to bring switch arms 150, 151, etc., into contact wtih contacts 2, the circuits of erasing and recording coils $E_2$ and $R_2$ are closed and the motor is energized to run in the opposite direction, effecting a recording on another lane of the tape in a direction contrary to the recording on the first lane. And when switch $S_1$ is operated to move the switch arms into contact with contacts 3, the circuits of erasing and recording coils $E_3$ and $R_3$ are closed, and the drive motor is energized to drive the tape in the first direction, effecting a recording on the third lane of the tape, in a direction the same as on the first lane. It will of course be understood that while erasing and recording coils $E_1$ and $R_1$ have been described as effecting a recording on one edge lane of the tape, erasing and recording coils $E_2$ and $R_2$ as effecting a recording on the middle lane of the tape, and erasing and recording coils $E_3$ and $R_3$ as effecting a recording on the opposite edge lane of the tape, there is nevertheless no necessary order in which the recordings are made on the three lanes. In other words, the middle lane, instead of being recorded second, might be recorded either first or last. It is a feature of the invention, however, that successive recordings are made with reverse directions of travel of the tape.

It will be evident that the control shaft 158 of switch $S_1$ may be rotated manually to its successive positions. Preferably, however, automatic means are provided for operating the switch at the end of each run of the tape. The present illustrative mechanism 160 for rotating switch shaft 158 through 90° at the end of each run of the tape, comprises a ratchet wheel 250 mounted on the end of shaft 158 and engageable by a pawl 251 pivotally mounted on the end of a plunger 252 connected to the movable core of a solenoid 253. A compression spring 254 acting between the end of solenoid 253 and a flange on plunger 252 normally extends the plunger and pawl to such a position as indicated in Fig. 13. When solenoid 253 is energized, the solenoid core and plunger 252 move toward the right, as viewed in Fig. 13, pawl 251 engaging ratchet reel 250 and rotating it toward the right. Switch shaft 158 has a squared portion 158a adjacent ratchet reel 250, and bearing on this squared portion is a flat spring member 260 mounted on a fixed support 261, and so disposed as to lie against one flat face of squared portion 158a when the switch is in any one of its four positions of rest. The ratchet reel 250 having been moved through somewhat better than an eighth of a revolution by pawl 251, flat spring 260 bearing on squared shaft portion 158a moves the shaft through the balance of a full quarter turn, so that the shaft is moved a quarter of a turn each time solenoid 253 is energized. When the solenoid is deenergized, the plunger moves forwardly under the pressure of spring 254, pawl 251 pivoting on plunger 252 to clear the ratchet projection. The heel of pawl 251 engages a shoulder 252a on plunger 252 during its operative stroke to hold it rigidly in the position illustrated during engagement and movement of the ratchet reel.

Solenoid 253 has one lead 265 going to an energizing battery 266, the other side of which is connected to a conductor 267. A branch conductor 267a of conductor 267 is connected to one of a pair of contacts closed by depression of the aforementioned control button S, the other contact of which is connected by conductor 269 to the other side of solenoid 253. Thus depression of control button S energizes solenoid 253, and therefore actuates mechanism 160 to operate switch S₁ through successive quarter turns. In other words, if switch S₁ is in position with its switch arms making with contacts 1, so as to record on lane 1, then depression of control button S will move the arms of switch S₁ to make with contacts 2, thus setting the machine to run in reverse direction and connecting erasing and recording coils E₂ and R₂ in circuit. Depression of control button S however causes Take button T to be released, and the machine is therefore set to record on lane 2 by depression of button S, but the machine will not begin to run in the reverse direction until control T is again depressed. Depression of control button S thus has the effect of shifting switch S₁ to the next successive position, thus shifting from one lane to the next, or from the last lane to neutral position, and stopping the machine.

For the purpose of automatic energization of solenoid 253 at the end of each run of the tape through the machine, the following switching arrangements are provided.

The stretch of tape M between reel 35 and drive pulley 46 passes between a pair of felt faced lugs 280 extending from a swinging arm 281, the pivoted end of which has a hub 281a pivotally mounted on the reduced extremity 282 of a stud 283 mounted on panel 16, the center of axis of the pivotal mounting coinciding approximately with the point of tangency of the tape with pulley 46. Hub 281a is confined on 282 by reason of the proximity of pulley 46 which is positioned just outside it. It will be evident that this arm 281 will be swung by the tape as the tape is wound on or off reel 35, and that the total angle of swing will depend upon the diameter of the tape when fully wound on said reel.

Arm 281 has a rearwardly projecting lug 286 which closes certain contacts of a pair of switches 287 and 288 as said arm reaches opposite limits of its angular travel. Thus, as said arm nears the upper limit of its travel (the tape being nearly off reel 35), its lug 286 engages an insulation member 290 on an arm 291 of switch 287, moving arm 291 to bring its switch contact against a contact carried by a switch arm 292. A circuit is thereby closed to a warning signal, as later to be described. A suitable time after the warning signal circuit has thus been closed, lug 286 engages and moves an insulation member 295 carried by a switch arm 296 to open a circuit between a contact carried by arm 296 and a contact carried by a switch arm 297, and also acts, through insulation member 298 between arm 296 and a switch arm 299, to close a circuit between contacts carried by arms 299 and 300. Switch contacts 291, 292, 296, 297, 299 and 300 are all carried on a suitable insulation block 302 secured to the face of panel 16.

Switch 288, similar to switch 287, and actuated as arm 281 reaches the lower limit of its travel (with the tape nearly fully reeled on reel 35), is carried by an insulation block 305 secured to the rearward face of an adjustable swinging arm 306 pivotally mounted on a reduced portion 307 of stud 283. Arm 306 has an arcuate portion 308 provided with notches 309 adapted to be selectively engaged by a spring pressed detent 310, and it will be evident that the extent of downward angular travel of arm 281 prior to operation of switch 288 is determined by the setting of arcuate arm portion 308 with reference to detent 310. The notches 309 of arm portion 308 are calibrated in diameters of reel 35. Thus, if a small reel, say of 6″ in diameter, is to be used on the machine, arm 304 will be moved to a position with its notch 6 engaged by detent 310, so that switch 288 will be so positioned as to be operated as tape M reaches an angular position near its lowermost (full-reel) extreme for a 6″ reel. Arm 304 is shown adjusted for a 6″ reel in Fig. 1.

In downward movement of arm 281, arm lug 286 first engages an insulation member 314 closing a circuit between switch arms 315 and 316, and then, after a suitable time period, engages and moves an insulation member 317, breaking a circuit between switch arms 318 and 319, and closing a circuit between switch arms 320 and 321.

As shown in Fig. 13, switch arms 291, 292 and 315, 316 which are closed just prior to the upward and downward limits of movement of tape following arm 281, are connected in parallel across leads 325 and 326 going to warning signal 327, which may typically be a buzzer, and battery 328. This buzzer will therefore sound a short time before the magnetic tape reaches the end of its travel in either direction of operation.

Switch arms 299, 300 and 320, 321 are connected in parallel across leads 330 and 331, lead 330 being connected to one side of solenoid 253, and lead 331 being connected to contact 332 contacted by a cooperating contact 333 when control button T is depressed. Contact 333 is connected to the aforementioned conductor 267, which is connected, via battery 266 and conductor 265, to the other end of solenoid 253.

Thus control button T being depressed, when either switch arms 299 and 300 or switch arms 315 and 316 are closed, as tape following arm 281 reaches the upper or lower limit of its angular travel, a circuit is formed energizing solenoid 253, and thereby actuating mechanism 160 to advance shaft 158 of switch $S_1$ through a quarter turn. Accordingly, as the magnetic tape nears the end of its travel in either direction of operation of the machine, switch $S_1$ is automatically actuated to advance through a quarter turn, thus reversing the direction of the drive motor to cause the tape to be driven in the opposite direction, and cutting in the next set of erasing and recording coils, as previously described. Of course, at the end of recording lane 3, the automatic operation of switch $S_1$ carries the switch arms of switch $S_1$ back to neutral position, therefore opening the motor circuit and stopping the machine.

Thus, as the tape reaches a predetermined limit of travel in each direction, the switch $S_1$ is stepped ahead, which sets the machine to run in the reverse direction and connects in the next set of translating and erasing magnets; and this actuation of switch $S_1$ at the predetermined end lmits of travel of the tape may be accomplished automatically, by closure of switches 287 or 288 by the tape, as described immediately above, or manually by depression of the control button S, as first described. It will be understood that when automatic actuation of switch $S_1$ is employed, such actuation will occur automatically at definite end positions of the tape, whereas with manually controlled actuation of switch $S_1$, e. g., by use of control button S, the above mentioned predetermined end limits of travel are not precisely located points but are limited end zones in the travel of the tape, within which the button S may or is to be manually depressed, the approach or beginning of said zones being preferably marked and made known to the operator for instance by a warning signal such as 327 which gives an indication a suitable interval of time prior to complete unwinding of the tape from the tape supplying reel.

Depression of reverse button R causes the machine, regardless of what direction in which it may have been running, to reverse the direction of travel of the tape. To avoid confusion, the tape will always hereinafter be spoken of as running in a forward direction when the tape is travelling in a proper direction for recording on any lane to which reference is made, and as running in reverse when travelling in a contrary direction. In other words, in the present illustrative embodiment of the invention, when switch $S_1$ is in position with its switch arms making with contacts 1, so that erasing coils $E_1$ and recording coils $R_1$ are in closed circuit, the tape is moving "forwardly" when travelling downwardly through recording head 60, so as to pass coils $E_1$ first and coils $R_1$ second, and is travelling in "reverse" direction when moving upwardly through the sound head. When switch $S_1$ is in position with its arms making with contacts 2 so that erasing coils $E_2$ and $R_2$ are in closed circuit, the forward or recording direction of the tape is upwardly through the sound head, and the reverse direction of the tape is downwardly through the sound head. Finally, when switch $S_1$ is in position with its arms making with contacts 3, with erasing coils $E_3$ and $R_3$ in circuit, the forward or recording direction of the tape is downwardly through the sound head, and the reverse direction of the tape is upwardly through the sound head.

With this understanding, depression of Reverse button R, regardless of which set of erasing and recording coils may be in circuit, and therefore in which direction the tape may be travelling, effects "reverse" drive of the tape, which continues either until button R is released, as by depression of either Stop button St, Take button T, or Listen button L, or until the tape running in reverse reaches the end of the recording lane. Assuming switch $S_1$ to be in position with its arms making with either contacts 1 or 3, so that the tape is travelling downwardly through sound head 60, and either lane 1 or lane 3 are being recorded on, depression of button R closes a circuit as follows: Switch contact 338, electrically connected by branching conductor 338a to contacts 1, 3 and n of switch arm 155, makes with contact 339, connected by lead 340 to solenoid winding 341 of a relay $R_1$, the other side of winding 341 being connected by conductor 342 to the aforementioned switch arm 296. Switch arm 297, normally in contact with switch arm 296, is connected by conductor 296a to switch arm 318, and switch arm 319, normally in contact with switch arm 318, is electrically connected by lead 348 to arm 155 of switch $S_1$, the circuit being completed from arm 155 to contact 1 or 3, as the case may be. A battery 345 is placed in the circuit, here shown as included in conductor 342. Depression of button R thus has the effect of energizing winding 341 of relay $R_1$.

This energization of relay winding 341 acts through movable solenoid core 349 and insulation member 350 connected thereto, against a restoring spring 351, to bring an electrically conductive switch member 352 across switch contacts 353 and 354. This effects a closure of the circuit 240, 245 energizing motor reversing relay winding 220, so that the motor is connected to run in reverse direction.

Since depression of reverse button R effects release of Take button T, however, the motor energizing circuit is open at this time at contacts 210, 211 controlled by button T. Means controlled by relay $R_1$ are therefore provided for closing the motor circuit when button R is depressed. To this end, relay member 350 is provided with an electrically conductive member 358 adapted to bridge electrical contacts 359 and 360 when winding 341 is energized. A circuit is thereby completed from lead 207, connected to one side of the line, through conductor 361 to contact 359, and from contact 360 by way of conductors 362 and 363 to lead 212 going to the motor, thus closing a circuit across contacts 210 and 211 which normally close the motor circuit, but which are open when the reverse button is depressed.

Assume now that the switch arms of switch $S_1$ are in contact with contacts 2. It will be remembered that a circuit is at such time formed through arm 153 of switch $S_1$ through lead 241 contacts 242 and 244, normally bridged by conductive member 243, to lead 245 going to motor reversing solenoid 220, and from there by way of conductor 240 back to switch arm 153. Motor reversing relay 218 is therefore energized and the motor connected to run in reverse, so as to drive the tape upwardly through sound head 60, this being the "forward" direction of the tape for lane 2. If now it is desired to run the tape in reverse direction for lane 2—that is, downwardly through the sound head, button R is depressed, and a circuit is thereby closed as follows: Contact 370, connected to switch contact 2 by conductor 371, makes with contact 372, connected by lead 373 to the solenoid winding 374 of relay R2, the other side of winding 374 being connected by lead 375 to the aforementioned conductor 342. Thus, depression of control button R when switch arm 155 is in contact with contact 2 of switch S1 effects closure of a circuit energizing the winding of relay R2.

The movable core 378 of winding 374 is then attracted and moves an insulation member 379, restrained by a spring 380, to bring the aforementioned electrically conductive member 243 out of contact with contacts 242 and 244, thereby opening motor reverse circuit 240, 241, which is normally closed when switch arm 153 is in contact with contact 2 of switch S1, so that the motor is again connected to drive in its normal forward direction, but to move the tape in "reverse" for recording lane 2.

The motor is energized at this time through the following connections: Lead 207, connected to one side of the line, lead 414, contact 416 of a pair of relay contacts 416 and 417, conductive bridging member 418 of relay R2, then in contact with 416 and 417, wire 419, wire 363, and lead 212 to one side of the motor, the other side of the motor being connected to the line as before.

Means are provided for automatically increasing the speed of the tape during travel in "reverse." A typical change speed device for this purpose is illustrated in and was described in connection with Figs. 2, 3 and 4. The solenoid 87 only of this speed change device is indicated in Fig. 13, one terminal of the solenoid winding being shown as connected by conductor 400 to a contact 401 of relay R1 and to a contact 402 of relay R2. The other side of the winding of solenoid 87 is connected by conductor 404 to a contact 405 of relay R1 and to a contact 406 of relay R2. Conductor 404 is shown as including a battery 408 for energization of solenoid 87. When the winding of relay R1 is energized, in effecting reverse travel of the tape for recording lanes 1 and 3, a conductive member 410 bridges contacts 401 and 405, thus closing the circuit of solenoid 87, and when the winding of relay R2 is energized, in effecting reverse travel of the tape for recording lane 2, conductive member 411 bridges contacts 402 and 406 to close the circuit to solenoid 87. This has the effect, as previously described, of moving solenoid plunger 86 to shift clutch 75 and therefore cause drive shaft 47 to be driven from motor 97 through high gear ratio pulleys 93 and 71 and connecting belts 91, thus substantially increasing the speed of travel of the tape.

The reason for so running the tape in reverse is of course to back-track any desired distance along the lane being recorded on, so that the machine can then be stopped and the tape then again run in a forward direction while the recording previously made is either listened to through a reproducing means, or else corrected by removing the previous recording and substituting a different recording. The reproducing means for listening back is set in operation by depressing Listen control button L. For instance, assuming that it is desired to listen back to a recording that has been made on the same lane being recorded, reverse button R is depressed, thus driving the tape in reverse. Reverse travel of the tape is then stopped either by depressing button St, which stops the machine entirely, after which button L would be depressed, or else by depressing button L at once. In either event, depression of button L closes circuits as follows: Contacts 500 and 501 make respectively with contacts 502 and 503, the latter being connected to leads 504 and 505, respectively, connected to a speaker 506. Switch contacts 500 and 501 are connected to leads 192 and 191, respectively, connected to the output end of amplifier 190. Switch arms 151 and 152 of switch S1 are connected by leads 196 and 197, respectively, to stationary contacts 510 and 511, which are contacted, respectively, by contacts 512 and 513 upon depression of control button L. Said contacts 512 and 513 are connected by leads 185 and 515, respectively, across the end terminals of the primary winding of the aforementioned input transformer 187 to amplifier 190. It will thus be evident that depression of control button L connects whichever pair of recording coils happens to be in closed circuit, depending upon the position of switch arms 151 and 152, to the input end of amplifier 190, and connects the output end of said amplifier to speaker 506. With connections so made, forward travel of the tape will cause the recording thereon to be reproduced by the recording coils and speaker. It will thus be seen that the same coils used for recording are employed for listening back, the coils thus serving as recording coils when Take button T is depressed, and as reproducing coils when Listen button L is depressed.

Depression of button L not only connects said coils to speaker 506, but also effects closure of the motor circuit, so that the motor will cause the tape to be driven ahead for reproducing purposes. Thus, depression of button L effects closure of contacts 520 and 521, connected across leads 212 and 209, closing the circuit of motor 97.

Thus, when it is desired to listen back along the lane being recorded, button R will first be depressed to run the tape in a reverse direction as far as necessary, at which time stop button St may be depressed, causing button R to be released and so stopping the machine. Listen button L may then be depressed, energizing the motor to run again to drive the tape in a forward direction, and also connecting the proper recording coils to the speaker, the coils at this time functioning as reproducing coils. Or, Listen button L may be depressed without first depressing stop button St, in which case the machine immediately changes direction, with the same results as before, depression of the stop button thus not being essential. It will be evident that depression of reverse button R, followed by depression of Listen button L, will effect reverse travel of the tape, and then forward travel of the tape, regardless of which lane may at the time be in use.

If, having run the tape in reverse to a given point in the previously made recording, it is then desired to remove some of the recording beyond that point and to replace it with a corrected recording, button T is depressed, and the corrected recording made simply by speaking into microphone 180 as before. The erasing coils remove the previously made recording, and the recording coils impress the new recording on the erased area of the recording lane being traversed.

The system as described involves means for automatically stopping the machine at the end of each recording lane when the machine is driving the tape in reverse. This means comprises the previously described pairs of switch arms 296, 297 and 318, 319, of switches 287 and 288, which are opened by tape following arm 281 at the end of the travel of the tape in opposite directions. Opening of either of these pairs of contacts opens the energizing circuit to relays $R_1$ and $R_2$, through one or the other of which drive motor 97 is energized when reverse button R is depressed. Drive motor 97 accordingly is automatically stopped at the end of the recording lane in travel of the tape in either direction when the machine is running under control of reverse button R.

It has now been described how the tape may be caused to travel in reverse along a given recording lane to any desired point thereon, in order that the recording following that point may either be audibly reproduced and reviewed, or else erased and, if desired, replaced by a corrected recording. It it is desired to listen back to a previously traversed lane, or to correct a previously traversed lane, control button S may be depressed the proper number of times to move switch $S_1$ to position to connect the proper recording and erasing coils in circuit. Thus, assuming that switch $S_1$ is in position with its switch arms making with contacts 3, so that the machine is in condition to record along lane 3, if it should be desired to listen back to the recording on lane 1, control button S would be depressed, causing switch operating mechanism 160 to move the arms of switch $S_1$ to neutral position, button $S_t$ would then be depressed to release button S, and button S would then be again depressed to operate switch actuating mechanism 160 to move the arms of switch $S_1$ to make with contacts 1. The machine is then in condition to record on lane 1, or listen back to matter previously recorded on lane 1.

If Listen button L is then depressed, the machine will drive the tape forwardly to the end of lane 1. At this time, the solenoid 253 controlling switch operating mechanism 160 is energized by closure of circuit leads 267 and 331 by the switch mechanism operated by tape following arm 281, said circuit being at this time closed at contacts 540 and 541 controlled by button L. The switch arms of switch $S_1$ are accordingly moved to make with contacts 2, and the tape is accordingly driven in a forward direction for recording on lane 2, the recording previously made on lane 2 then being reproduced at speaker 506. Thus, with Listen button L depressed, the tape is again driven in alternate directions, with recording coils $R_1$, $R_2$ and $R_3$ being successively cut into circuit, so that the entire recording made on the three recording lanes may be consecutively reproduced.

Assume now that a recording has been carried to the end of lane 3, and that switch operating mechanism 160 has been automatically actuated, in the manner previously described, to move the arms of switch $S_1$ to neutral contacts $n$, and that it is then desired to run the tape in reverse to the beginning end of lane 1. Contact $n$ of switch arm 155 is connected to one branch of conductor 338$a$, as previously mentioned. But the circuits controlled by reverse button R are open at this time at switch arms 318 and 319 of switch 288, so that depression of button R at this time would be ineffective without auxiliary means for bridging switch arms 318 and 319. Accordingly, a normally open switch 560 is connected across leads 342 and 348. Reverse button R is then depressed, and switch 560 is held closed for a moment, thus closing circuit 342, 348 energizing reverse relay $R_1$ and thereby energizing motor 97 to drive the tape. As soon as the tape has moved a sufficient distance to allow switch arms 318 and 319 to reclose, switch 560 may be released.

A visual signal is preferably provided to indicate the position of switch $S_1$, in order that the operator will know at all times whether the first, second or third lane recording coils are in circuit. As a simple means to this end, contacts 1, 2 and 3 traversed by arm 156 of switch $S_1$ are connected by conductors 570, 571 and 572, to illuminants 573, 574 and 575, respectively, a return lead 576 connected to the other side of the three illuminants being connected, via battery 578, to switch arm 156. Neutral contact $n$ is left open. Thus, the recording lane in use at any given time is indicated by the illumination of the corresponding one of these illuminants, which, may, if desired, be of different colors. When switch $S_1$ is in neutral position, all illuminants are extinguished.

The invention has been described with sound recordation particularly in view. However, as will be evident, the invention in many of its aspects is adaptable to the recording and reproduction of electric currents which are not necessarily sound or voice currents. For the purpose of certain of the broader claims, the expression record current is employed to denote the electric current flowing in the translating coils, either in recording or reproduction, whether or not said current is a sound or voice current.

It will be understood that the specific exemplification of the invention here given is for illustrative purposes only, and that various changes in design, structure and in the arrangement of the electrical system, may be made without departing from the spirit and scope of the invention or of the appended claims.

We claim:

1. In a magnetic recording system, the combination of a flat magnetizable tape, means for longitudinally moving said tape in reverse directions, a plurality of sets of erasing and translating electromagnets mounted in operative relation to said tape and offset transversely of the tape with respect to one another so as to act on adjacent longitudinally extending lanes of the tape, and means for successively energizing said sets of erasing and translating electromagnets as the tape is moved in one direction and then the other.

2. In a magnetic recording system, the combination of a flat magnetizable tape, means for longitudinally moving said tape in reverse directions, a plurality of sets of erasing and translating electromagnets mounted in operative relation to said tape and offset transversely of the tape with respect to one another so as to act on adjacent longitudinally extending lanes of the tape, and means automatically actuated at the end of the travel of the tape in each direction for successively energizing said sets of erasing and translating electromagnets.

3. In a magnetic recording machine, the combination of erasing and translating magnets between and past which a magnetic tape may be moved, a pair of reels adapted to supply and take up the tape moved past said magnets, each of said reels each acting as a supply or take up reel depending upon the direction of movement of the tape past the magnets, driving means acting on the tape between said reels for moving said tape past said magnets at constant speed in either direction, and driving interconnections between said driving means and said reels adapted to drive said reels alternately as said drive means moves the tape in one direction or the other, each of said driving interconnections including a one way driving clutch, said clutches acting in such directions as to drive selectively the reel functioning as the take up reel for each direction of movement of the tape by said drive means.

4. In a magnetic recording machine, the combination of erasing and translating magnets between and past which a magnetic tape may be moved, a pair of closely adjacent, concentric reels adapted to supply and take up the tape moved past said magnets, said reels each acting as a supply or take up reel depending upon the direction of movement of the tape past the magnets, driving means acting on the tape between said reels for moving said tape past said magnets at constant speed in either direction, and driving interconnections between said driving means and said reels adapted to drive said reels alternately as said drive means moves the tape in one direction or the other, each of said driving interconnections including a one way driving clutch, said clutches acting in such directions as to drive selectively the reel functioning as the take up reel for each direction of movement of the tape by said drive means.

5. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means automatically operable as the tape reaches a predetermined limit of travel in each direction for reversing the direction of drive of the tape, and automatic means for consecutively connecting said sets of erasing and translating magnets to said erasing and recording current circuits as the tape reverses direction at the end of travel in either direction.

6. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, and manually controllable means operable at intermediate points in the travel of the tape in either direction for reversing the direction of travel of the tape.

7. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, and manually controllable means operable to successively change connection of the erasing and recording current circuits from set to set of the erasing and translating magnets.

8. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, and manually controllable means operable to successively change connection of the erasing and recording current circuits from set to set of the erasing and translating magnets and to correspondingly change the direction of travel of the tape.

9. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, manually controllable means operable at intermediate points in the travel of the tape in either direction for reversing the direction of travel of the tape, and manually controllable means operable to successively change connection of the erasing and recording current circuits from set to set of the erasing and translating magnets and to correspondingly change the direction of travel of the tape.

10. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, manually controllable means operable at intermediate points in the travel of the tape in either direction for reversing the direction of travel of the tape, and means actuated upon operation of said manually controllable means for increasing the speed of travel of the tape.

11. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, reversible drive means for the tape, means operable at a predetermined limit of travel of the tape in each direction for reversing the direction of drive of the tape, means for consecutively connecting said sets of erasing and translating magnets to said erasing and recording current circuits as the tape reverses direction at the end of travel in either direction, manually controllable means operable at intermediate points in the travel of the tape in either direction for reversing the direction of travel of the tape, means actuated upon operation of said last mentioned manually controllable means for increasing the speed of travel of the tape, and manually controllable means operable to successively change connection of the erasing and recording current circuits from set to set of the erasing and translating magnets and to correspondingly change the direction of travel of the tape.

12. In a magnetic recording system, the combination of a flat magnetizable tape, means guiding said tape for movement along a fixed line of travel, reversible drive means for the tape, means operable near the end of the travel of the tape in each direction for reversing the direction of drive of the tape, a plurality of sets of successively used erasing and translating magnets mounted in operative relation to said tape along said line of travel and offset transversely of the tape with respect to one another so as to act on adjacent longitudinally extending areas of the tape, the erasing and translating magnets of each such set being spaced apart longitudinally of the tape, and successively used sets of magnets having their erasing magnets positioned ahead of the translating magnets for the alternating directions of travel of the tape, erasing and recording current circuits for said sets of magnets, and means for consecutively connecting said successively used sets of magnets to said erasing and recording current circuits as the tape reverses direction at the end of travel in each direction.

13. In a magnetic recording system, the combination of a flat magnetizable tape, means guiding said tape for movement along a fixed line of travel, reversible drive means for the tape, means operable near the end of the travel of the tape in each direction for reversing the direction of drive of the tape, a plurality of sets of successively used erasing and translating magnets mounted in operative relation to said tape along said line of travel and offset transversely of the tape with respect to one another so as to act on adjacent longitudinally extending areas of the tape, the erasing and translating magnets of each such set being spaced apart longitudinally of the tape, different sets of said magnets having their erasing and translating magnets located in reverse order along said line of travel of said tape, erasing and recording current circuits for said sets of magnets, and means operable as the tape is driven from end to end in contrary directions to connect said circuits to successive sets of magnets having their erasing and translating magnets in reverse orders along said line of travel, in such manner that the tape passes the connected set of magnets erasing magnets first and translating magnets last.

14. In a magnetic recording machine, the combination of a flat magnetizable tape, guide means for guiding said tape for movement along a fixed line of travel, a pair of reels adapted to supply and take up the tape from opposite ends of said fixed line of travel, a plurality of sets of erasing and translating magnets mounted in operative relation to said tape along said fixed line of travel and offset transversely of the tape with respect to one another so as to act on adjacent longitudinally extending lanes of the tape, electric drive means for the tape, switch means operable to reverse the direction of drive of said drive means, means for operating said switch near the end of the travel of the tape in each direction embodying means moved by transverse travel of the stretch of the tape between one of the reels and said guide means, erasing and recording current circuits, and means for connecting successive sets of erasing and translating magnets to said circuits as said switch means is operated to reverse the direction of drive of the tape.

15. In a magnetic recording system, the combination of erasing and translating magnets between which a magnetic tape may be moved, means for guiding a tape for movement between said magnets, driving means for driving the tape in either direction between said magnets, means automatically actuated at the end of the travel of the tape in each direction for reversing the direction of drive of the tape by said driving means, and a warning signal automatically actuated by the tape a predetermined interval of time before the direction of drive of the tape is so reversed.

16. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, a reversible drive motor, tape driving means driven by said motor, an electric motor-reversing circuit adapted when energized to reverse the direction of said motor, an electric switching system including switching means movable to successive operating positions, said switching means connecting said erasing and recording current circuits to successive sets of erasing and translating electromagnets as it is moved from position to position, means for moving said switching means ahead one position as the tape reaches a predetermined limit of travel in either direction, and said switching system having contacts closing said motor reversing circuit in an alternate operating position of said switching means, whereby the tape is driven alternately in reverse direction as the switching means is moved from position to position.

17. In a magnetic recording system, the combination of a flat magnetizable tape, means guiding said tape for movement along a fixed line of travel, a plurality of sets of erasing and translating electromagnets mounted in operative relation to said tape along said line of travel and offset transversely of the tape with respect to one another so as to act on adjacent longitudinally extending lanes of the tape, erasing and recording current circuits for said sets of electromagnets, a reversible drive motor, tape driving means driven by said motor, an electric circuit adapted when energized to reverse the direction of said motor, an electric switching system including switching means movable from a neutral position step by step through a plurality of successive operating positions and back to neutral position, said switching means connecting said erasing recording current circuits to successive sets of erasing and translating coils as it is moved from position to position, electromagnetic means for moving said switching means ahead one position as the tape reaches a predetermined limit of travel in either direction, an electric energizing circuit for said electromagnetic means automatically energized by virtue of the tape reaching said predetermined limit of travel in either direction, and said switching system having contacts closing said motor reversing circuit in alternate operating positions of the switching means whereby the tape is driven alternately in reverse directions as the switching means is moved from position to position.

18. In a magnetic sound recording system, the combination of a flat magnetizable tape, means for longitudinally moving said tape in reverse directions, a plurality of sets of erasing and translating magnets mounted in operative relation to said tape and offset transversely of the tape with respect to one another so as to act on adjacent longitudinally extending lanes of the tape, means for producing a sound current and an erasing current, and switching means for causing said currents to flow in the erasing and translating magnets, respectively, of any selected one of said sets.

19. In a magnetic sound record system, the combination of a flat magnetizable tape, means for longitudinally driving said tape at uniform speed in reverse directions, a plurality of pairs of translating magnets mounted in operative relation to said tape and offset transversely of the tape with respect to one another so as to act on adjacent longitudinally extending lanes of said tape, a circuit for sound currents, an acoustic device in said circuit, and switching means for connecting said circuit to any selected pair of translating magnets.

20. In a magnetic sound record system, the combination of a flat magnetizable tape, means for longitudinally driving said tape at uniform speed in reverse directions, a plurality of pairs of translating magnets mounted in operative relation to said tape and offset transversely of the tape with respect to one another so as to act on adjacent longitudinally extending lanes of said tape, a circuit for sound currents, an acoustic device in said circuit, and switching means for successively connecting said circuit to said pairs of translating magnets as the tape is moved in one direction and then the other.

21. In a magnetic recording machine, the combination of translating magnets between which a magnetic tape may be moved, a pair of reels adapted to supply and take up the tape moved past said magnets, a tape driving pulley engaging said tape between said reels, driving means adapted to drive said pulley at constant speed in either direction, and driving interconnections between said driving means and each of said reels adapted to drive said reels alternately as said driving means drives said pulley in one direction and then the other, each of said driving interconnections including a one-way driving clutch, said clutches driving in such directions as to drive selectively the reel toward which the tape is being driven.

22. In a magnetic recording machine, the combination of translating magnets between which a magnetic tape may be moved, a pair of reels adapted to supply and take up the tape moved past said magnets, a tape driving pulley engaging said tape between said reels, driving means adapted to drive said pulley at constant speed in either direction, and means for increasing the speed of drive of said pulley.

23. In a magnetic recording machine, the combination of translating magnets between which a magnetic tape may be moved, a pair of reels adapted to supply and take up the tape moved past said magnets, a tape driving pulley engaging said tape between said reels, driving means adapted to drive said pulley at constant speed in either direction, means for automatically reversing the direction of drive of said pulley at predetermined limits of travel of the tape, and manually controllable means for reversing the direction of drive of said pulley at points between said limits.

24. In a magnetic record system, the combination of a flat magnetizable tape, means for longitudinally driving said tape in either direction at constant speed, translating magnet means selectively operable on adjacent lanes of the tape, means for reversing the direction of drive of the tape as the tape reaches a predetermined limit of travel in each direction, means for changing the lane of the tape operated on by the translating magnet means as the direction of drive of the tape is so reversed, and means for reversing the direction of drive of the tape between said predetermined limits without changing the lane of the tape operated on by the translating magnet means.

25. In a magnetic record system, the combination of a flat magnetizable tape, means for longitudinally moving said tape in reverse directions, a plurality of sets of translating electromagnets mounted in operative relation to said tape and offset transversely of the tape with respect to one another so as to act on adjacent longitudinally extending lanes of the tape, a circuit for record currents, and means for selectively connecting said circuit to any one of said sets of translating magnets.

26. In a magnetic record system, the combination of a flat magnetizable tape, means for longitudinally moving said tape in reverse directions, a plurality of sets of translating electromagnets mounted in operative relation to said tape and offset transversely of the tape with respect to one another so as to act on adjacent longitudinally extending lanes of the tape, a circuit for record currents and means for consecutively connecting said circuit to said sets of translating magnets.

27. In a magnetic record system, the combination of a flat magnetizable tape, means for longitudinally moving the tape in reverse directions, means for reversing the direction of travel of the tape at predetermined limits of travel, a plurality of sets of translating electromagnets mounted in operative relation to said tape and offset transversely of the tape with respect to one another so as to act on adjacent longitudinally extending lanes of the tape, a circuit for record currents, and means for successively connecting said circuit to different sets of said translating magnets as the direction of travel of the tape is reversed at said limits of travel.

28. In a magnetic record system, the combination of a flat magnetizable tape, means for longitudinally moving the tape in reverse directions, means for reversing the direction of travel of the tape at a predetermined limit of travel, a plurality of sets of translating electromagnets mounted in operative relation to said tape and offset transversely of the tape with respect to one another so as to act on adjacent longitudinally extending lanes of the tape, a circuit for record currents and means for switching the connection of said circuit from one of said sets of translating magnets to another as the direction of travel of the tape is reversed at said limit of travel.

29. In a magnetic record system, the combination of a flat magnetizable tape, translating magnets for said tape, means for guiding said tape to travel between said magnets, drive means for driving said tape, means for reversing the direction of drive of the tape by said drive means at predetermined limits of travel of the tape, and manually controllable means for reversing the direction of drive of the tape by said driving means at points between said limits.

30. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, reversible drive means for the tape, means operable at a predetermined limit of travel of the tape in each direction for reversing the direction of drive of the tape, an electric record current circuit, and means for connecting said circuit consecutively to said sets of translating electromagnets as the tape reverses direction at the end of travel in either direction.

31. In a magnetic record machine, the combination of a flat magnetizable tape, means guiding said tape for movement along a fixed path of travel, a plurality of sets of translating electromagnets mounted in operative relation to said tape along said path of travel and positioned in offset relation with reference to one another transversely of the tape so as to act on adjacent longitudinally extending lanes of the tape, an electrical circuit for record currents, reversible drive means for the tape, means operable at a predetermined limit of travel of the tape in each direction for reversing the direction of drive of the tape, means for consecutively connecting said sets of translating magnets to said electrical circuit, as the tape reverses direction at the end of travel in each direction, and manually controllable means operable to successively change connection of said electrical circuit from set to set of the translating magnets.

32. In a magnetic record machine, the combination of a flat magnetizable tape, guide means for guiding said tape for movement along a fixed line of travel, a pair of reels adapted to supply and take up the tape from opposite ends of said fixed line of travel, a plurality of sets of translating electromagnets mounted in operative relation to adjacent non-overlapping longitudinally extending lanes of said tape along said fixed line of travel, electric drive means for the tape, switch means operable to reverse the direction of drive of said drive means, means for operating said switch means at a predetermined limit of travel of the tape in each direction embodying means moved by change of position of the tape with reference to said reels, an electrical circuit for record currents, and means for consecutively connecting sets of said translating electromagnets to said circuit as said switch means is operated to reverse the direction of drive of the tape.

33. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, means for moving said switch means ahead one position as the tape reaches a predetermined limit of travel in either direction, said switching system having motor reversing contacts closing said motor reversing circuit in an alternate operating position of said switch means, whereby the tape is driven alternately in reverse directions as the switch means is moved from position to position, and manually controllable switch means for reversing the direction of said motor, said last mentioned switch means being arranged to open said motor reverse circuit while said motor reverse contacts are closed, and to close said motor reverse circuit while said motor reverse contacts are open.

34. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, means for moving said switch means ahead one position as the tape reaches a predetermined limit of travel in either direction, said switching system having motor reversing contacts closing said motor reversing circuit in an alternate operating position of said switch means, whereby the tape is driven alternately in reverse directions as the switch means is moved from position to position, a manually operable motor reverse switch, and means controlled by said manually operable motor reverse switch and by said step-by-step switch means to open said motor reverse circuit when said step-by-step switch means is in said alternate position causing said motor reverse contacts in said motor reverse circuit to be closed, and to close said motor reverse circuit when said step-by-step switch means is in positions in which said motor reverse contacts in said motor reverse circuit are open.

35. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, means for moving said switch means ahead one position as the tape reaches a predetermined limit of travel in either direction, said switching system having motor reversing contacts closing said motor reversing circuit in an alternate operating position of said switch means, whereby the tape is driven alternately in reverse directions as the switch means is moved from position to position, a manually operable motor reverse switch, means controlled by said manually operable motor reverse switch and by said step-by-step switch means to open said motor reverse circuit when said step-by-step switch means is in said alternate position causing said motor reverse contacts in said motor reverse circuit to be closed, and to close said motor reverse circuit when said step-by-step switch means is in positions in which said motor reverse contacts in said motor reverse circuit are open, a source of electric power, an electric circuit for connecting said source of power to said drive motor, switch means controlling said circuit, said switch means being arranged to open said circuit when said manually operable motor reverse switch is operated to reverse said motor, and electric circuiting for connecting said source of power to said motor, said circuiting being arranged to be closed under the control of said motor reverse switch when said switch is operated to reverse the motor.

36. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, means for moving said switch means ahead one position as the tape reaches a predetermined limit of travel in either direction, said switching system having motor reversing contacts closing said motor reversing circuit in an alternate operating position of said switch means, whereby the tape is driven alternately in reverse directions as the switch means is moved from position to position, a manually operable motor reverse switch, means controlled by said manually operable motor reverse switch and by said step-by-step switch means to open said motor reverse circuit when said step-by-step switch means is in said alternate position causing said motor reverse contacts in said motor reverse circuit to be closed, and to close said motor reverse circuit when said step-by-step switch means is in positions in which said motor reverse contacts in said motor reverse circuit are open, a source of electric power, an electric circuit for connecting said source of power to said drive motor, switch means controlling said circuit, said switch means being arranged to open said circuit when said manually operable motor reverse switch is operated to reverse said motor, electric circuiting for connecting said source of power to said motor, said circuiting being arranged to be closed under the control of said motor reverse switch when said switch is operated to reverse the motor, and limit switches for opening said last mentioned circuiting when the tape reaches either of its said limits of travel.

37. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, electromagnetic means for moving said switch means ahead one position as the tape reaches a predetermined limit of travel in either direction, an electric energizing circuit for said electromagnetic means, control switch contacts in said energizing circuit, limit switches in said circuit, one of which is automatically closed at each of said predetermined limits of travel of the tape, said switching system having motor reversing contacts closing said motor reversing circuit in an alternate operating position of said switch means, whereby the tape is driven alternately in reverse directions as the switch means is moved from position to position, a manually operable motor reverse switch, means controlled by said manually operable motor reverse switch and by said step-by-step switch means to open said motor reverse circuit when said step-by-step switch means is in said alternate position causing said motor reverse contacts in said motor reverse circuit to be closed, and to close said motor reverse circuit when said step-by-step switch means is in positions in which said motor reverse contacts in said motor reverse circuit are open, and said control switch contacts in said energizing circuit for said electromagnetic means being opened when said motor reverse switch is operated to reverse the motor.

38. In a magnetic recording system, the combination of a flat magnetizable tape, means guiding said tape for movement along a fixed line of travel, a plurality of sets of translating electromagnets mounted in operative relation to said tape along said line of travel and offset transversely of the tape with respect to one another so as to act on adjacent longitudinally extending lanes of the tape, recording current circuits for said sets of electromagnets, a reversible drive motor, tape driving means driven by said motor, an electric motor-reversing circuit adapted when energized to reverse the direction of said motor, an electric switching system including switch means movable step-by-step to successive positions, said switch means acting to connect said recording current circuits to successive sets of translating electromagnets as it is moved from position to position, electromagnetic means for moving said switch means ahead one position as the tape reaches a predetermined limit of travel in either direction, an electric energizing circuit for said electromagnetic means, control switch contacts in said energizing circuit, limit switches in said circuit, one of which is automatically closed at each of said predetermined limits of travel of the tape, said switching system having motor reversing contacts closing said motor reversing circuit in an alternate operating position of said switch means, whereby the tape is driven alternately in reverse directions as the switch means is moved from position to position, a manually operable motor reverse switch, means controlled by said manually operable motor reverse switch and by said step-by-step switch means to open said motor reverse circuit when said step-by-step switch means is in said alternate position causing said motor reverse contacts in said motor reverse circuit to be closed, and to close said motor reverse circuit when said step-by-step switch means is in positions in which said motor reverse contacts in said motor reverse circuit are open, a source of electric power, an electric power circuit for connecting said source of power to said drive motor, power circuit switch contacts in said circuit, said power circuit switch contacts and said control switch contacts in said energizing circuit for said electromagnetic means being opened by virtue of operation of said motor reverse switch to reverse the motor, electric circuiting for connecting said source of power to said motor, said circuiting being arranged to be closed under the control of said motor reverse switch when said switch is operated to reverse the motor, and limit switches for opening said last mentioned circuiting when the tape reaches its said limits of travel.

39. In a magnetic record system, the combination of a flat magnetizable tape, means for longitudinally driving said tape in either direction at constant speed, translating magnet means selectively operable on adjacent lanes of the tape, means for reversing the direction of drive of the tape as the tape reaches a predetermined limit of travel in each direction, means for changing the lane of the tape operated on by the translating magnet means as the direction of drive of the tape is so reversed at said predetermined limits of travel of the tape, and means for changing the lane of the tape operated on by the translating magnet means and for reversing the direction of travel of the tape at points between said limits of travel of the tape.

40. In a magnetic record system, the combination of a flat magnetizable tape, means for longitudinally driving said tape in either direction at constant speed, translating magnet means selectively operable on adjacent lanes of the tape, means for reversing the direction of drive of the tape when the tape has reached a predetermined limit of travel in each direction, means for changing the lane of the tape operated on by the translating magnet means as the direction of drive of the tape is so reversed, means for reversing the direction of drive of the tape between said limits without changing the lane of the tape operated on by the translating magnet means, and means for increasing the speed of travel of the tape while the tape is so moving in reverse owing to operation of the last mentioned means.

41. In a multiple lane magnetic sound record system, the combination of a flat magnetizable tape, a plurality of sets of translating electromagnets mounted in operative relation to said tape, said electromagnets being spaced from one another longitudinally of the tape and offset transversely of the tape with respect to one another so as to act exclusively on adjacent non-overlapping longitudinally extending lanes of the tape, and pole pieces having shank portions longitudinally slidable through the electromagnets of each such set and having tips of reduced widths transversely of the tape and with thin pole faces adapted to coact severally with said non-overlapping lanes of said tape, the shank portion of each of said pole pieces rearwardly of its said tip having a cross-sectional dimension transversely of the tape which is substantially greater than the dimension transversely of the tape of the pole piece at the extremity of its tip.

HERMAN S. HELLER.
LEO G. BUTLER.

CERTIFICATE OF CORRECTION.

Patent No. 2,213,631. September 3, 1940.

HERMAN S. HELLER, ET AL.

It is hereby certified that error appears in the printed specification of the above numbered patent requiring correction as follows: Page 13, first column, line 6, claim 16, for the word "direction" read --directions--; line 34, claim 17, after "reaching" insert --its--; line 38, claim 17, after "means" insert a comma; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.